(12) United States Patent
Deshpande

(10) Patent No.: US 7,366,720 B2
(45) Date of Patent: Apr. 29, 2008

(54) SYSTEM FOR REMOTE SHARE ACCESS

(75) Inventor: Sachin Deshpande, Vancouver, WA (US)

(73) Assignee: Sharp Laboratories of America, Camas, WA (US)

( * ) Notice: Subject to any disclaimer, the term of this patent is extended or adjusted under 35 U.S.C. 154(b) by 443 days.

(21) Appl. No.: 10/961,285

(22) Filed: Oct. 7, 2004

(65) Prior Publication Data

US 2005/0149508 A1 Jul. 7, 2005

Related U.S. Application Data

(60) Provisional application No. 60/535,187, filed on Jan. 6, 2004, provisional application No. 60/535,119, filed on Jan. 6, 2004.

(51) Int. Cl.
  *G06F 17/30* (2006.01)
(52) U.S. Cl. .......................................... 707/9; 709/226
(58) Field of Classification Search ..................... 707/3
  See application file for complete search history.

(56) References Cited

U.S. PATENT DOCUMENTS

| 6,226,680 B1* | 5/2001 | Boucher et al. ............. 709/230 |
| 2002/0152299 A1* | 10/2002 | Traversat et al. ........... 709/223 |
| 2002/0161865 A1* | 10/2002 | Nguyen ...................... 709/220 |
| 2003/0088544 A1* | 5/2003 | Kan et al. ...................... 707/3 |
| 2003/0101294 A1* | 5/2003 | Saint-Hilaire et al. ......... 710/11 |
| 2004/0039781 A1* | 2/2004 | LaVallee et al. ............ 709/205 |
| 2004/0044725 A1* | 3/2004 | Bell et al. ................... 709/203 |
| 2004/0068524 A1* | 4/2004 | Aboulhosn et al. ......... 707/200 |

OTHER PUBLICATIONS

Wikipedia "SMBS", the Encyclopedia of Internet.*
Implement CIFS: The common Internet File System, Prentice Hall, Aug. 11, 2003, Sec. 22.3.5, Rap Annoyances, last paragraph, lines 1-3.*
Theotokis et al. "A Suvey of Peer to Peer File Sharing Technologies", ELTRUN, 2002, p. 1-31.*
LimeWire "A File Sharing Program Running on the Gnutella Network", 2002.*

* cited by examiner

*Primary Examiner*—Charles Rones
*Assistant Examiner*—Yuk Choi
(74) *Attorney, Agent, or Firm*—Stolowitz Ford Cowger LLP

(57) ABSTRACT

A distributed share folder & file discovery system allows different local computers to discover hosts and share folders without having to go through a central master browser. The local computer sends a device name query directly to any remote devices connected to a same network. The local computer then sends out a share query to the remote devices identified during the device name query to identify any folders or files that are available for sharing (shares). The local computer assembles a list of shares available on the remote devices and mounts any of the shares that are selected from the list.

24 Claims, 5 Drawing Sheets

(background)

SYSTEM FOR REMOTE SHARE ACCESS

RELATED APPLICATIONS

This application claims priority from provisional patent application Ser. No. 60/535,187, filed Jan. 6, 2004, entitled: SYSTEM FOR REMOTE SHARE ACCESS. This application is also related to another provisional patent application Ser. No. 60/535,119, filed Jan. 6, 2004, entitled: INTELLIGENT DISCOVERY OF SHARES, the contents of which are hereby incorporated herein by reference in their entirety.

BACKGROUND OF THE INVENTION

1. Technical Field

This disclosure relates to computer networks, and, more specifically, to a system for sharing files over a computer network.

2. Description of the Related Art

Referring to FIG. 1, software programs exist that allow computers to share files. One example is the Microsoft® Windows® folder sharing. A user tags folders, such as folders 8 on host computers 6 as available for sharing with other computers. The user might also assign a password to the tagged folders 8. A local computer 2 that wants to discover the hosts (and their shared folders 8) has to access a central computer that operates as master browser 4.

The master browser 4 discovers the hosts 6 from their announcement messages and relays the shared folder information to the local computer 2. The local computer 2 displays a list of all the hosts. The local computer can then discover share folders from any of the hosts. A user can then select any of the share folder 8 for mounting and use the share files 3 in the mounted share folder 8 on the local computer 2. Mounting allows the local computer 2 to utilize the share files 3 as if they were available locally. The Windows Browser Service is described at http://www.microsoft.com/resources/documentation/windows/2000/server/reskit/en-us/tcpip/part4/tcpappi.mspx.

Current network neighborhood programs use centralized discovery. Centralized discovery uses a centralized master browser 4 on the network for discovering the host computers 6. Some networks, such as a user's home network, may not be set up with a master browser 4. In these networks, there is no way for local computers 2 to discover hosts on the network and then in turn discover their shares using above approach. Further, centralized discovery systems may require excessive time to identify new host computers that are recently attached to the network. Thus, the centralized discovery approach is not effective for certain network systems.

Embodiments of the invention address these and other limitations in the prior art.

SUMMARY OF THE INVENTION

A distributed share file discovery system allows different local computers to discover hosts and share folders without having to go through a central master browser. The local computer sends a device name query directly to any remote devices connected to a same network. The local computer then sends out a share query to the remote devices identified during the device name query to identify any folders or files that are available for sharing (shares). The local computer assembles a list of shares available on the remote devices and mounts any of the shares that are selected from the list.

The foregoing and other features and advantages of the invention will become more readily apparent from the following detailed description of a preferred embodiment of the invention that proceeds with reference to the accompanying drawings.

DETAILED DESCRIPTION

Figure 1:
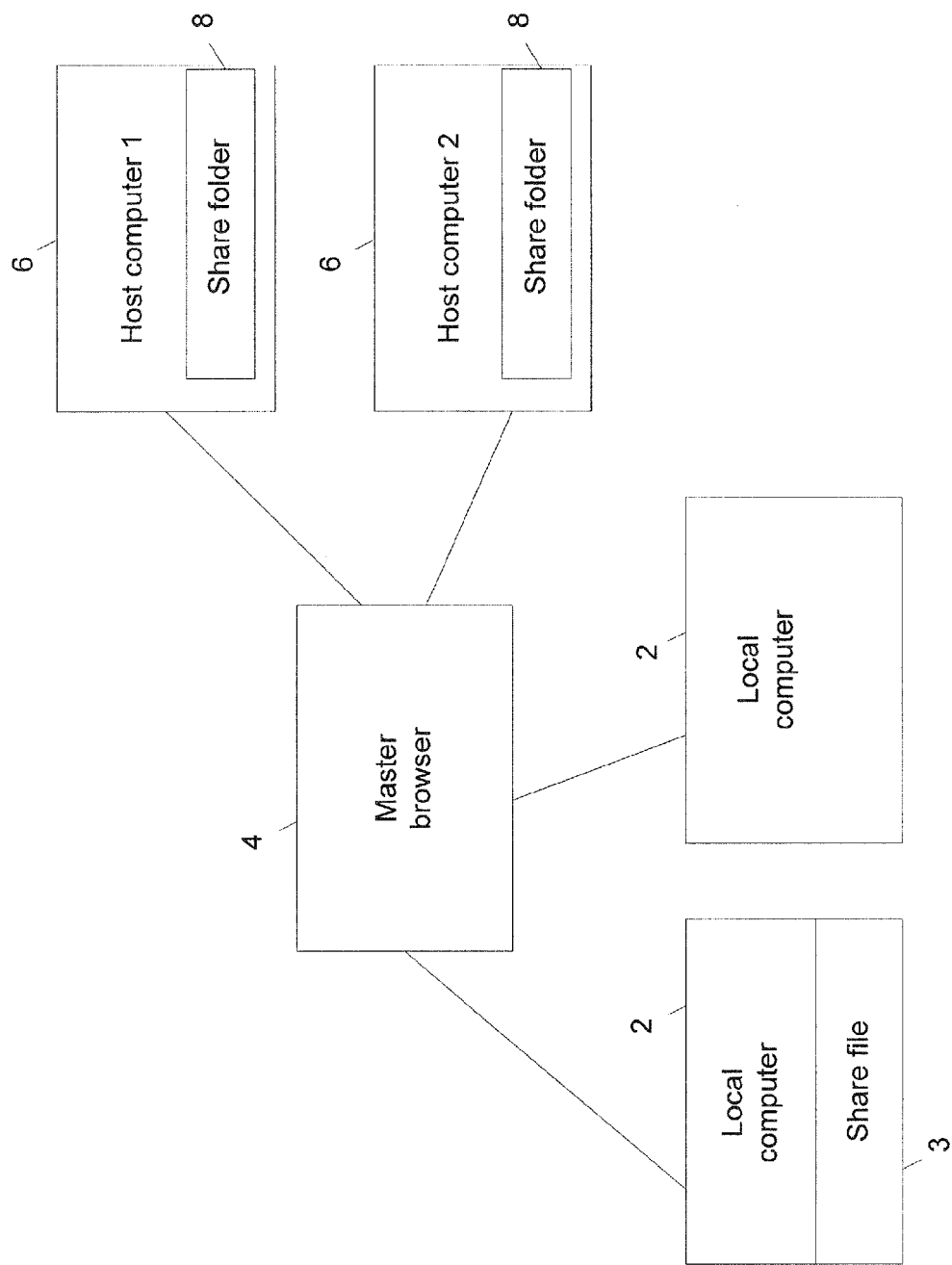
FIG. 1 is a block diagram of centralized share file discovery system.
Figure 2:
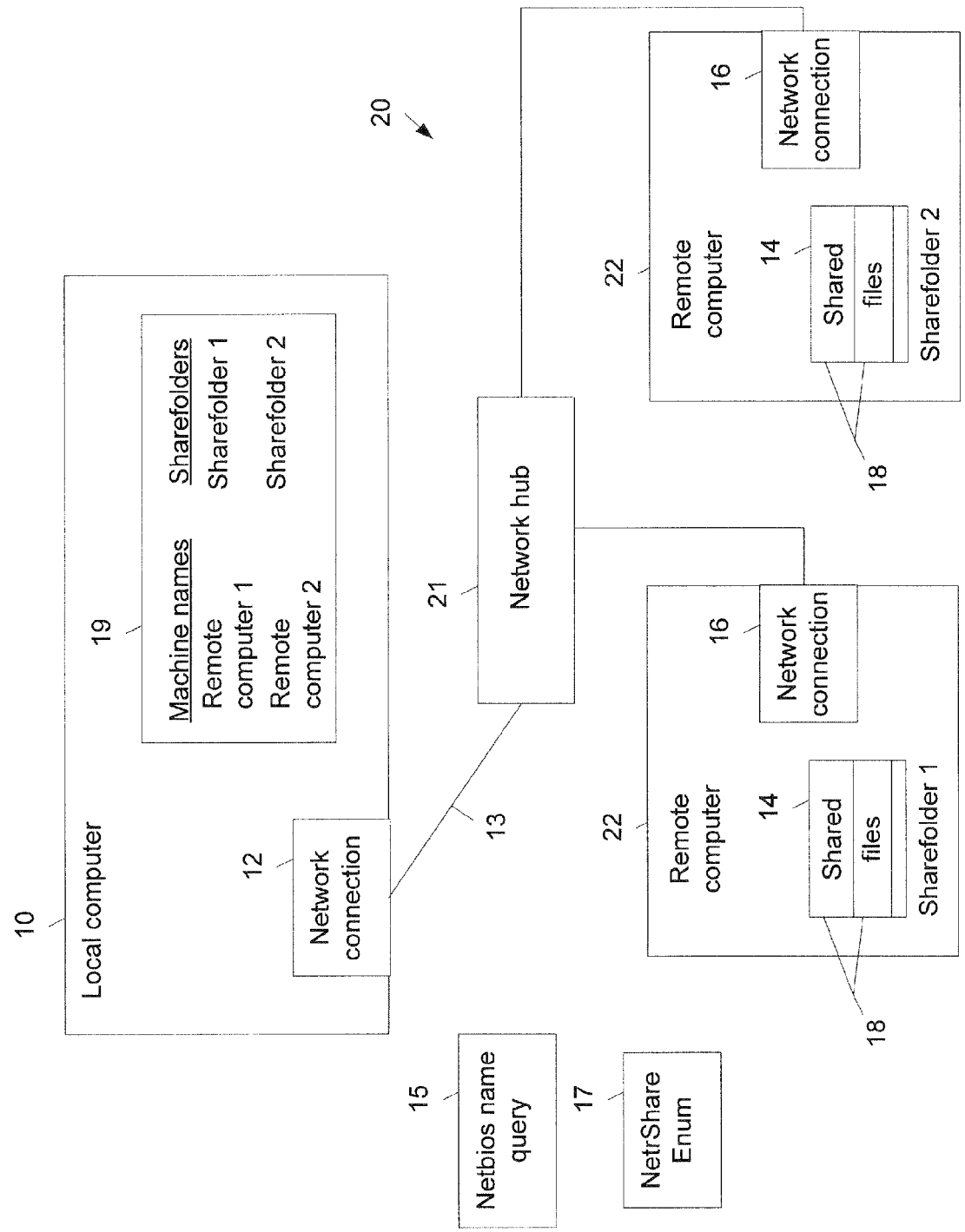
FIG. 2 is a block diagram of a distributed share file discovery system.

FIG. 2 is a block diagram of a distributed share file discovery system 20. A local computer 10 has a network connection 12 to a network hub 21. The local computer 10 can be any type of computing device including a Personal Computer (PC), television system, stereo system, etc. that may need to access or share files from or with other devices. Although FIG. 2 illustrates the network connection 12 as a wired connection, the connection 12 may also be wireless. In this case the network hub 21 may be a wireless access point.

The network hub 21 is also connected to two remote computers 22, such as PCs, servers, television system, audio system, or any other type of computing system that may have content that is available for sharing with local computer 10. Each remote computer 22 has a network connection 16. In alternate embodiments, the local computer 10 and remote computers 22 may each be connected to a common network 13 without using the network hub 21. For example cross-over cables or wireless Ad-Hoc connection modes may be used. In alternate embodiments the network connection may use other network technologies e.g. Infra Red, USB, Powerline etc.

One or both of the remote computers 22 contain one or more folders 14 that hold files 18. Conventional network protocols, for example, the Microsoft® Windows® sharing option, can be used for designating the folders 14 as share folders. Designating a share folder allows the folder 14 on the remote computers 22 to be shared with other devices, such as local computer 10. Folders or files designated as available for sharing with other computing systems will be referred to as "shares".

Figure 3:
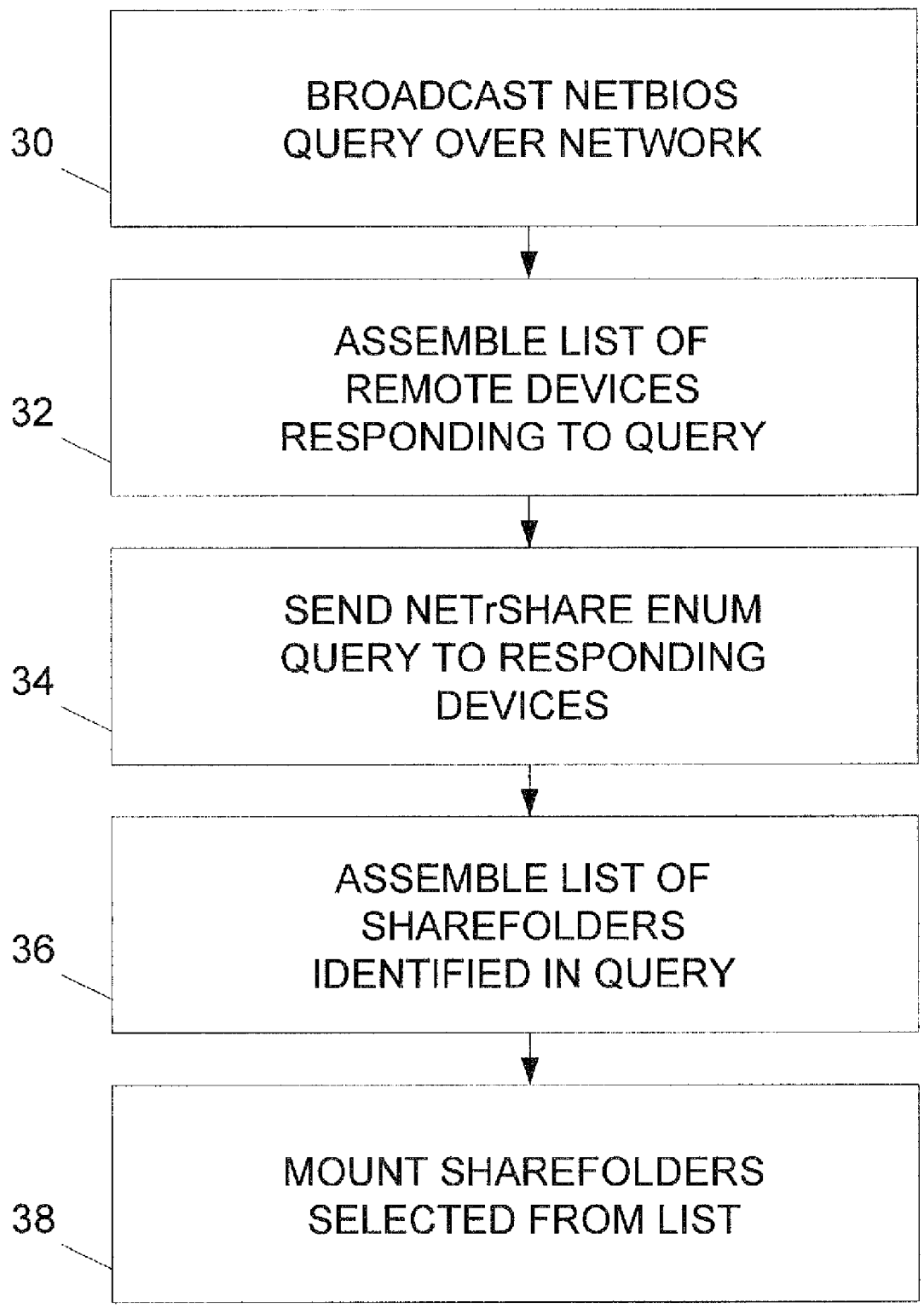
FIG. 3 is a flow diagram describing the operation of the distributed share file discovery system shown in FIG. 2.

Referring to FIGS. 2 and 3, in one embodiment of the invention, a NetBIOS name query 15 is broadcast over network 13 by the local computer 10 in block 30 (FIG. 3). The NetBIOS name query 15 discovers hosts, Server Message Blocks (SMBs)/Common Internet File System (CIFS) servers, or any other device on the network 13.

NetBIOS is an acronym for Network Basic Input Output System, which is an Application Program Interface (API) or program that augments a computer's Basic Input Output System (BIOS) by adding special functions for Local Area Networks (LANs).

NetBIOS was designed for use by groups of PCs, sharing a broadcast medium. Both connection (Session) and connectionless (Datagram) services are provided, and broadcast and multicast are supported. Participants are identified by name. Assignment of names is distributed and highly dynamic. Request For Comment (RFC) 1001 available at http://www.ietf.org/rfc/rfc1001.txt defines concepts and methods and a protocol standard for a NetBIOS service on a TCP/UDP transport which is herein incorporated by reference.

Each of the computers 10 and 22 support the NetBIOS functions and can communicate over the network 13 using NetBIOS commands and features, as well as other typical network commands and features.

In this example, the NetBIOS name query 15 is sent using a broadcast address by local computer 10 to discover the remote computers 22. The NetBIOS query 15 can also be used to identify server services on the network 13 by using a particular service number, such as the service number 20. In response to the NetBIOS name query 15, each remote computer 22 sends back its Internet Protocol (IP) address along with some additional information flags. In block 32, the local computer 10 receives the responses from the remote computers 22 and assembles a list of all the hosts or servers on network 13.

In block 34 (FIG. 3), the local computer 10 sends a NetrShareEnum request 17 to each of the identified servers or hosts, such as remote computers 22. The NetrShareEnum request 17 is defined by the SMB protocol that queries each of the remote computers 22 for any share folders or files. In response to the NetrShareEnum request 17, the remote computers 22 identify any previously designated share folders 14. In block 36 (FIG. 3), the local computer 10 assembles a list 19 identifying the names of all the computers discovered in the NetBIOS name query 15 and listing all the share folders identified on those computers during the NetrShareEnum query 17.

In block 38, the list 19 is displayed on the local computer 10. A user can select any of the folders displayed in list 19. Selecting a displayed folder initiates a mount operation. If the shared folders have an associated password, then the local computer 10 may present a password prompt after the user selects the share folder or this information (username, password) may be preconfigured by the user. The mount operation causes the selected folder to operate as if available locally on computer 10. In one embodiment, the mounting operation uses a series of SMB and CIFS messages that allow any applications operating on the local computer 10 to be performed on the share folders. For example, an application on local computer 10 that plays an MPEG file.

The local computer 10 may store a list of the particular folders that are selected for mounting by the user. The next time the local computer 10 is operated, the local computer 10 can automatically mount the folders that were previously selected for mounting from the earlier discovery and mounting session.

The local computer 10 can save the Internet Protocol (IP) address and the NetBIOS name of the discovered devices on network 13. Some of the previously discovered machines may not be discovered during a next discovery session. The local computer 10 can send a NetrShareEnum request 17 or try to mount previously listed folders for computers that were identified in previous discovery sessions, but not necessarily discovered in the latest discovery session. This has the advantage of allowing the local computer 10 to attempt to mount and access shared folders without having to wait for discovery responses back from the remote computers 22 in a subsequent discovery session.

The NetBIOS query and remote computer response (request/response) protocol can provide faster share folder identification than centralized browser systems. The centralized browser systems often have to wait to receive a notification from new devices that are connected to the network. This can take several minutes for a new device to advertise and the centralized browser to then detect the existence of the new device on the network. However, the queries 15 sent by the local computer can immediately identify new devices on the Network.

QUERY EXAMPLES

In the description below, the term server refers to one of the remote computers 22 having share folders 14, and the term client refers to the local computer 10. The following processes are example processes that may be used by the client to access the remote share folders 14.

The NetBIOS query 15 may be sent to discover all hosts on the network 13. An example network transaction for this is shown below:

NetBIOS Name query from client to the network:

---

NetBIOS Name Service
    Transaction ID: 0x7602
    Flags: 0x0110 (Name query)
        0... .... .... .... = Query
        .000 0... .... .... = Name query
        .... ..0. .... .... = Message is not truncated
        .... ...1 .... .... = Do query recursively
        .... .... ...1 .... = Broadcast packet
    Questions: 1
    Answer RRs: 0
    Authority RRs: 0
    Additional RRs: 0
    Queries
      *<00><00><00><00><00><00><00><00><00><00><00><00><00><00><00>: type NB, class inet

---

Alternately the discovery may be done for all hosts with "server" service (SMB/CIFS servers) on the network 13. An example network transaction for this is shown below:

Network Name query from client to the network:

---

NetBIOS Name Service
    Transaction ID: 0x3301
    Flags: 0x0110 (Name query)
        0... .... .... .... = Query
        .000 0... .... .... = Name query
        .... ..0. .... .... = Message is not truncated
        .... ...1 .... .... = Do query recursively
        .... .... ...1 .... = Broadcast packet
    Questions: 1
    Answer RRs: 0
    Authority RRs: 0
    Additional RRs: 0
    Queries
      *SMBSERVER     <20>: type NB, class inet

---

Each host 22 for the first case above and\or SMB/CIFS server 22 for the second case above responds to the NetBIOS name query 15. An example network transaction for this is shown below. Only the response from one CIFS server for the second case above is shown below. In general, the client 10 should receive a response from all the SMB/CIFS servers on the network.

NetBIOS Name query response from one CIFS server to the client:

```
NetBIOS Name Service
    Transaction ID: 0x3301
    Flags: 0x8500 (Name query response, No error)
        1... .... .... .... = Response
        .000 0... .... .... = Name query
        .... .1.. .... .... = Server is an authority for domain
        .... ..0. .... .... = Message is not truncated
        .... ...1 .... .... = Do query recursively
        .... .... 0... .... = Server can't do recursive queries
        .... .... ...0 .... = Not a broadcast packet
        .... .... 0000 = No error
    Questions: 0
    Answer RRs: 1
    Authority RRs: 0
    Additional RRs: 0
    Answers
    *SMBSERVER    <20>: type NB, class inet
        Name: *SMBSERVER    <20> (Server service)
        Type: NB
        Class: inet
        Time to live: 3 days, 11 hours, 20 minutes
        Data length: 6
        Flags: 0x6000 (H-node, unique)
            0... .... .... .... = Unique name
            .11. .... .... .... = H-node
        Addr: 192.168.0.11
```

Share folders for the each individual host/CIFS server are enumerated. This consists of a NetrShareEnum request 17 sent by the client 10 to each individual host or to each individual SMB/CIFS server. The host or SMB/CIFS server 22 responds to the request with a list of exported remote share folders 14. An example network transaction for this is shown below:

NetrShareEnum request from client to server:

```
NetBIOS Session Service
    Message Type: Session message
    Flags: 0x00
    Length: 180
SMB (Server Message Block Protocol)
    SMB Header
SMB Pipe Protocol
    Function: TransactNmPipe (0x0026)
    FID: 0x181d
DCE RPC
Microsoft Server Service
    Operation: NetrShareEnum (15)
    Server: \\Vidabcd01
        Referent ID: 0x042c458c
        Max Count: 13
        Offset: 0
        Actual Count: 13
        Server: \\Vidabcd01
    Shares
        Info Level: 1
        Info Level: 1
        SHARE_INFO_1_CONTAINER:
            Referent ID: 0x0972e1cc
            Number of entries: 0
            (NULL pointer) SHARE_INFO_1 array:
        Preferred length: 4294967295
        (NULL pointer) Enum Handle
```

The host or SMB/CIFS server 22 responds to the NetrShareEnum request 17 with a list of exported remote share folders 14. An example network transaction for this is shown below.

NetrShareEnum reply from server to client:

```
NetBIOS Session Service
    Message Type: Session message
    Flags: 0x00
    Length: 656
SMB (Server Message Block Protocol)
    SMB Header
SMB Pipe Protocol
    Function: TransactNmPipe (0x0026)
    FID: 0x181d
DCE RPC
Microsoft Server Service
    Operation: NetrShareEnum (15)
    Shares
        Info Level: 1
        Info Level: 1
        SHARE_INFO_1_CONTAINER: ADMIN$ IPC$ oa
            Referent ID: 0x00180388
            Number of entries: 3
            SHARE_INFO_1 array: ADMIN$ IPC$ oa
    ...
```

The client 10 gathers names of the remote share folders 14 using the above processes for each SMB/CIFS server on the network 13. In some embodiments the client 10 may display this list 19 of server names with their remote share names to a user. The user may then select one or more shares from one or more servers to be "mounted" as described below. Alternately, the client 10 may automatically or using some pre-defined criterion or algorithm may select one or more remote share folders 14 to be "mounted".

The selected remote shares from the above operation are mounted by the client 10. This can be done using the SMB/CIFS protocol. The operation involved include using one or more of the following SMB/CIFS protocol messages: SMB_COM_NEGOTIATE, SMB_COM_SESSION_SETUP_ANDX, SMB_COM_TREE_CONNECT_ANDX, etc.

The client 10 can then perform file and/or directory (folder) operations on the mounted files and directories. This operation may involve using one or more of the following SMB/CIFS protocol messages: SMB_COM_OPEN_ANDX, SMB_COM_READ, SMB_COM_WRITE, SMB_COM_CLOSE, etc.

After the file and/or directory operations are complete, the client 10 may disconnect the remote share folder 14. This may include using one or more of the following SMB/CIFS protocol messages: SMB_COM_TREE_DISCONNECT, etc.

Although the above description uses CIFS protocol for accessing "remotely exported" file shares, in other embodiments alternate protocols such as Network File System (NFS), other remote file system protocols etc. can alternatively be used, as is known in the art.

Applications

Many homes, offices, dorms, or other areas have computers that store media files, such as pictures, audio files, and video files. Many of these places also include more than one computer networked together. The distributed share file discovery system 20 allows media files, or any other type of file, stored on a remote computer to be accessed and played locally over a network by a local device.

Figure 4:
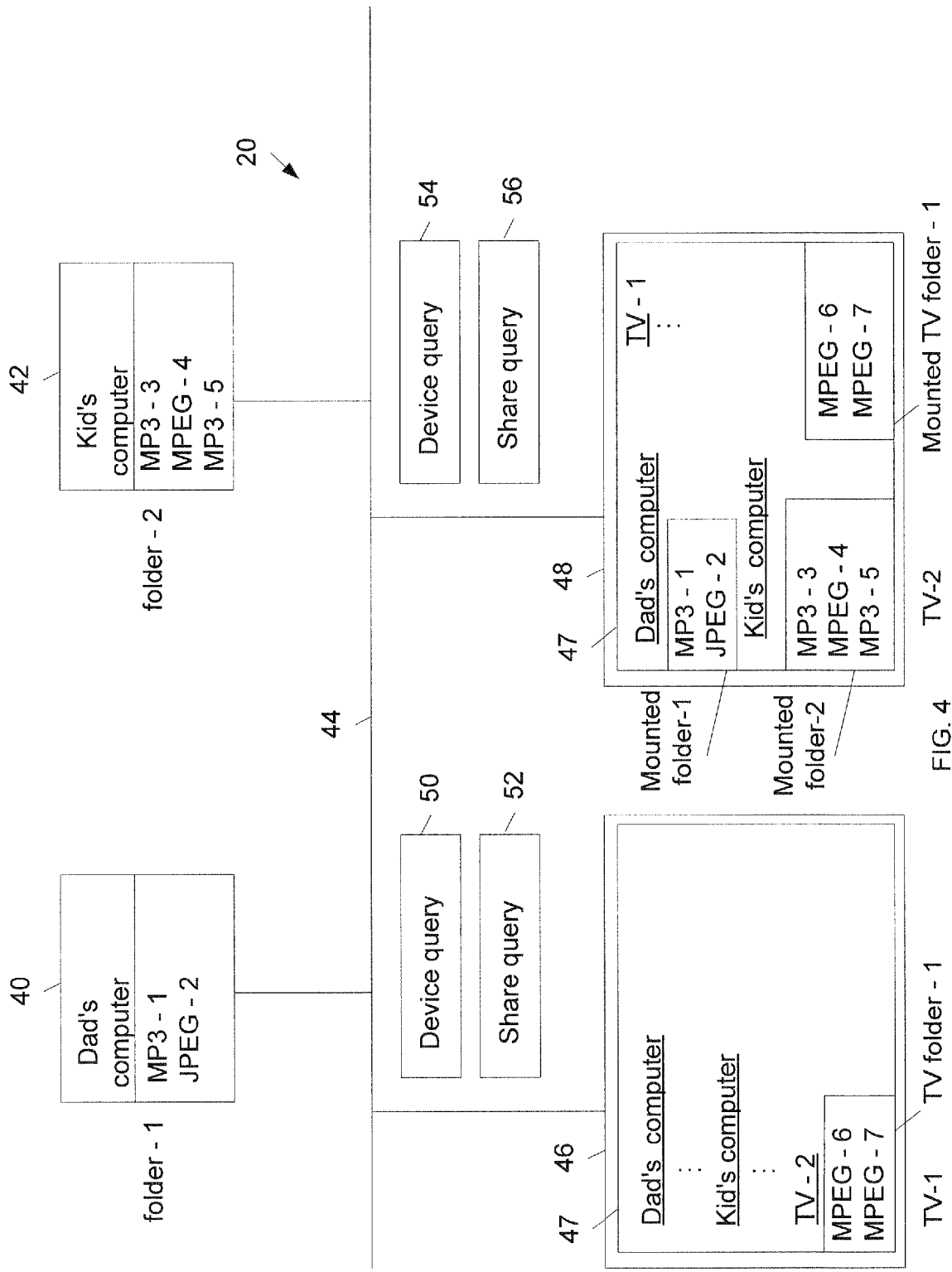
FIG. 4 is a block diagram of a home network that utilizes the distributed share file discovery system.

FIG. 4 shows televisions 46 and 48 each having a large screen 47 that can play video clips, audio files, or show pictures that are stored elsewhere on a computer network 44. The computer network 44 is connected to two personal computers (PCs) 40 and 42, television 46 and television 48.

The first PC 40 contains a share folder—folder1 which contains an MP3 file having the name MP3-1 and a JPEG file having the name JPEG-2. The second PC 42 includes a share folder—folder2 which contains a MP3 file having the name MP3-3, an MPEG file named MPEG-4 and another MP3 file named MP3-5. The first PC 40 is given the name Dad's Computer and the second PC 42 is given the name Kid's Computer. The television 46 contains a share folder—TVFolder1 containing two local files with the names MPEG-6 and MPEG-7.

The distributed discovery system 20 allows any of the devices 40, 42, 46 or 48 to individually discover share folders from other devices on network 44. For example, the television 46 can broadcast a device query 50 and subsequently a share query 52 to the other devices in the network 44. Similarly, the television 48 can also send device query 54 and share query 56 to the other devices on the network 44. Of course, the PCs 40 or 42 can also send device query and share queries. The device can mount selected share folders.

The television 46 displays the mounted folders on Dad's Computer 40 and discovered on the Kid's Computer 42 and also displays any mounted folders on television 48. Similarly, the television 48 displays the share folders discovered on the other devices 40, 42 and 46. Any of the files in the mounted folders can then be selected and then played out by the local device. Embodiments of the invention can operate on any properly networked device, which can be broadly interpreted, and is not limited to a typical computer network.

Figure 5:
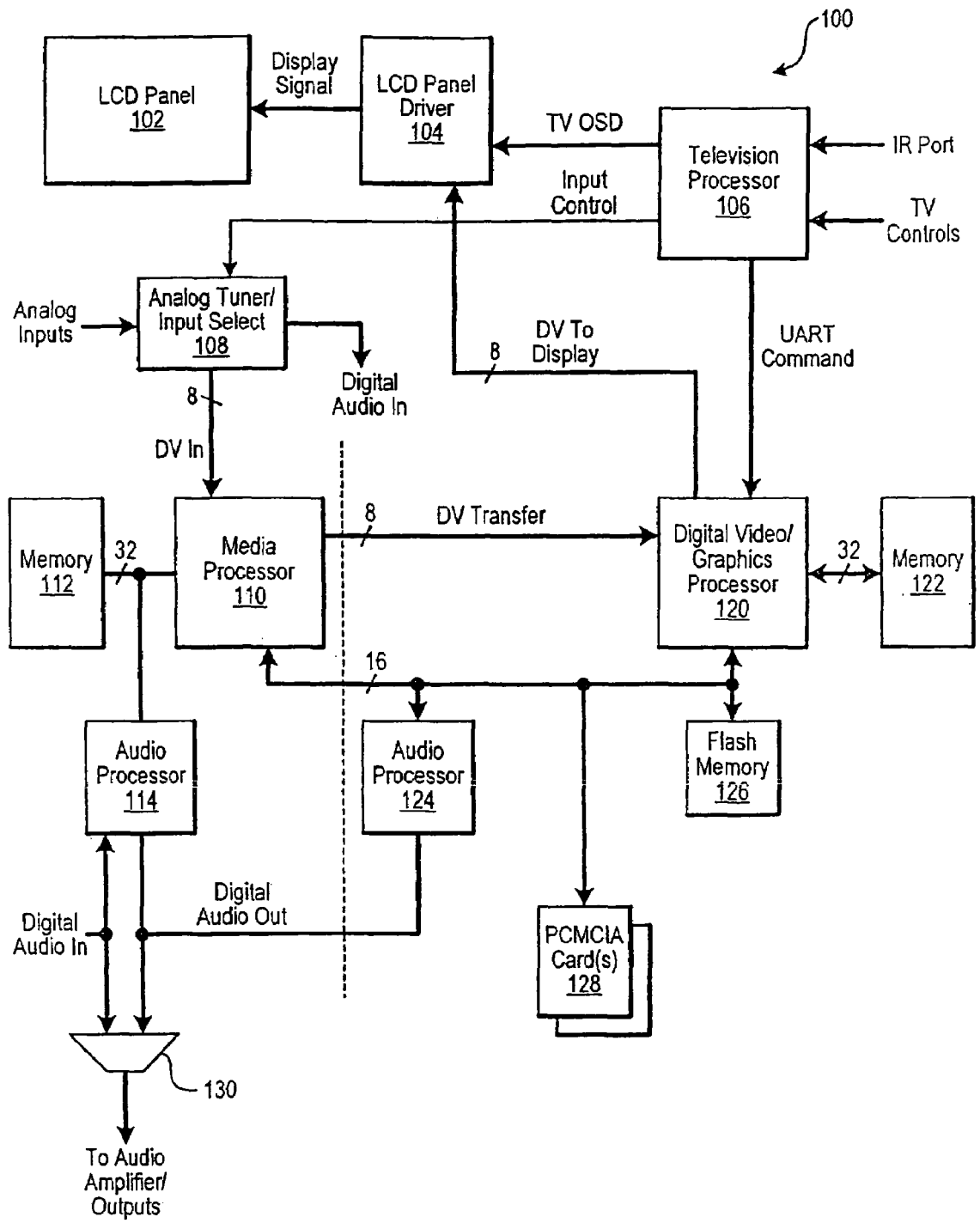
FIG. 5 is a detailed diagram for one of the television systems used in the home network shown in FIG. 4.

FIG. 5 shows in more detail a networked entertainment device, such as television 46 or 48 that can operate the distributed discovery and share system described above. FIG. 5 is a block diagram for a Liquid Crystal Display (LCD) television capable of operating according to some embodiments of the present invention. A television (TV) 100 includes an LCD panel 102 to display visual output to a viewer based on a display signal generated by an LCD panel driver 104. The LCD panel driver 104 accepts a primary digital video signal, which may be in a CCIR656 format (eight bits per pixel $YC_bC_r$, in a "4:2:2" data ratio wherein two $C_b$ and two $C_r$ pixels are supplied for every four luminance pixels), from a digital video/graphics processor 120.

A television processor 106 (TV processor) provides basic control functions and viewer input interfaces for the television 100. The TV processor 106 receives viewer commands, both from buttons located on the television itself (TV controls) and from a handheld remote control unit (not shown) through its IR (Infra Red) Port. Based on the viewer commands, the TV processor 106 controls an analog tuner/input select section 108, and also supplies user inputs to a digital video/graphics processor 120 over a Universal Asynchronous Receiver/Transmitter (UART) command channel. The TV processor 106 is also capable of generating basic On-Screen Display (OSD) graphics, e.g., indicating which input is selected, the current audio volume setting, etc. The TV processor 106 supplies these OSD graphics as a TV OSD signal to the LCD panel driver 104 for overlay on the display signal.

The analog tuner/input select section 108 allows the television 100 to switch between various analog (or possibly digital) inputs for both video and audio. Video inputs can include a radio frequency (RF) signal carrying broadcast television, digital television, and/or high-definition television signals, NTSC video, S-Video, and/or RGB component video inputs, although various embodiments may not accept each of these signal types or may accept signals in other formats (such as PAL). The selected video input is converted to a digital data stream, DV In, in CCIR656 format and supplied to a media processor 110.

The analog tuner/input select section 108 also selects an audio source, digitizes that source if necessary, and supplies that digitized source as Digital Audio In to an Audio Processor 114 and a multiplexer 130. The audio source can be selected—independent of the current video source—as the audio channel(s) of a currently tuned RF television signal, stereophonic or monophonic audio connected to television 100 by audio jacks corresponding to a video input, or an internal microphone.

The media processor 110 and the digital video/graphics processor 120 (digital video processor) provide various digital feature capabilities for the television 100, as will be explained further in the specific embodiments below. In some embodiments, the processors 110 and 120 can be TMS320DM270 signal processors, available from Texas Instruments, Inc., Dallas, Tex. The digital video processor 120 functions as a master processor, and the media processor 110 functions as a slave processor. The media processor 110 supplies digital video, either corresponding to DV In or to a decoded media stream from another source, to the digital video/graphics processor 120 over a DV transfer bus.

The media processor 110 performs MPEG (Moving Picture Expert Group) coding and decoding of digital media streams for television 100, as instructed by the digital video processor 120. A 32-bit-wide data bus connects memory 112, e.g., two 16-bit-wide×1M synchronous DRAM devices connected in parallel, to processor 110. An audio processor 114 also connects to this data bus to provide audio coding and decoding for media streams handled by the media processor 110.

The digital video processor 120 coordinates (and/or implements) many of the digital features of the television 100. A 32-bit-wide data bus connects a memory 122, e.g., two 16-bit-wide×1M synchronous DRAM devices connected in parallel, to the processor 120. A 16-bit-wide system bus connects the digital video processor 120 to the media processor 110, an audio processor 124, flash memory 126, and removable PCMCIA cards 128. The flash memory 126 stores boot code, configuration data, executable code, and Java code for graphics applications, etc. PCMCIA cards 128 can provide extended media and/or application capability. The digital video processor 120 can pass data from the DV transfer bus to the LCD panel driver 104 as is, and/or processor 120 can also supercede, modify, or superimpose the DV Transfer signal with other content.

The multiplexer 130 provides audio output to the television amplifier and line outputs (not shown) from one of three sources. The first source is the current Digital Audio In stream from the analog tuner/input select section 108. The second and third sources are the Digital Audio Outputs of audio processors 114 and 124. These two outputs are tied to the same input of multiplexer 130, since each audio processor 114, 124, is capable of tri-stating its output when it is not selected. In some embodiments, the processors 114 and 124 can be TMS320VC5416 signal processors, available from Texas Instruments, Inc., Dallas, Tex.

As can be seen from FIG. 5, the TV 100 is broadly divided into three main parts, each controlled by a separate CPU. Of course, other architectures are possible, and FIG. 5 only illustrates an example architecture. Broadly stated, and without listing all of the particular processor functions, the television processor 106 controls the television functions, such as changing channels, changing listening volume, brightness, and contrast, etc. The media processor 110 encodes audio and video (AV) input from whatever format it is received into one used elsewhere in the TV 100. The digital video processor 120 is responsible for decoding the previously encoded AV signals, which converts them into a signal that can be used by the panel driver 104 to display on the LCD panel 102.

In addition to decoding the previously encoded signals, the digital video processor 120 is responsible for accessing the PCMCIA based media 128, as described in detail below. Other duties of the digital video processor 120 include communicating with the television processor 106, and hosting an IP protocol stack. In alternate embodiments the IP protocol stack may be hosted on processor 106 or 110.

A PCMCIA card is a type of removable media card that can be connected to a personal computer, television, or other electronic device. Various card formats are defined in the PC Card standard release 8.0, by the Personal Computer Memory Card International Association, which is hereby incorporated by reference. The PCMCIA specifications define three physical sizes of PCMCIA (or PC) cards: Type I, Type II, and Type III. Additionally, cards related to PC cards include SmartMedia cards and Compact Flash cards. Type I PC cards typically include memory enhancements, such as RAM, flash memory, one-time-programming (OTP) memory and Electronically Erasable Programmable Memory (EEPROM). Type II PC cards generally include I/O functions, such as modems, LAN connections, and host communications. Type III PC cards may include rotating media (disks) or radio communication devices (wireless).

The TV system 100 can connect to a computer or an information network either through a wired or wireless connection. A wired connection could be connected to the digital video processor 120, such as a wired Ethernet port, as is known in the art. Additionally, or alternatively, the TV system 100 can connect to an information network through a wireless port, such as an 802.11b Ethernet port. Such a port can conveniently be located in one of the PCMCIA cards 128, which is connected to the media processor 110 and the digital video processor 120. Either of these processors 110, 120 could include the network protocols and other necessary underlying layers to support network commands on a network client or host running on the processors 110, 120.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A share discovery system, comprising:
a computer configured to conduct a device name query by addressing and sending one or more packets using a predetermined broadcast Internet Protocol (IP) address, the presence of the predetermined broadcast IP address in the packets causing remote devices located on a same Local Area Network (LAN) as the computer to provide their IP address to the computer responsive to observing the predetermined broadcast IP address contained in the packets;
the computer configured to correlate received responses to the sent packets to discover the IP addresses of the remote devices;
the computer configured to address and send share queries to the remote devices using the discovered IP addresses, the share queries requesting the remote devices to identify available share folders or files located on the remote devices;
the computer configured to assemble a list of the remote devices and available share folders or files located on the remote devices, the list assembled using information obtained using the share query; and
the computer configured to mount one or more of the listed share folders or files according to user selections such that the mounted share folders or files are not downloaded to the computer during the mounting but are made utilizable by the computer as if stored on the computer;
wherein the device name query and the share query are sent from the computer to the remote devices on the network and receive responses from the remote devices back to the computer without going through an intermediary master browser;
wherein the device name query is conducted using a NetBIOS name query and the share query is conducted using a NETrShareEnum query.

2. The share discovery system according to claim 1 wherein the device name query identifies Server Message Blocks (SMBs) and Common Internet File System (CIFS) servers on the network.

3. The share discovery system according to claim 1 wherein the computer automatically mounts one or more discovered share folders.

4. The share discovery system according to claim 1 wherein the computer displays the list of remote devices and available share folders or share files and then mounts any of the share folders or share files selected from the displayed list.

5. The share discovery system according to claim 1 wherein the user selects the available share folders to mount from a displayed list.

6. The share discovery system according to claim 1 wherein the computer stores the list of remote devices and available share folders or share files in memory and displays the list during a subsequent share session before conducting another device name query and share query.

7. The share discovery system according to claim 6 wherein the computer automatically attempts to mount any share folders or share files in the stored list that were previously mounted prior to conducting another device name query and share query.

8. The share discovery system according to claim 1 wherein the computer is a television computer system coupled to the network that discovers other network devices including remote computers or other television or audio systems on the network that contain media folders and files, the television computer system identifying media on the other network devices previously designated for sharing and playing selected ones of the identified media locally on the television computer system.

9. An apparatus for discovering share folders or share files, the apparatus comprising:
means for conducting a device name query by addressing and sending one or more packets using a predetermined broadcast Internet Protocol (IP) address, the presence of the predetermined broadcast IP address in the packets causing remote devices located on a Local Area Network (LAN) to provide their IP address responsive to observing the predetermined broadcast IP address contained in the packets:
means for correlating received responses to the sent packets to discover the IP addresses of the remote devices:
means for addressing and sending share queries to the remote devices using the discovered IP addresses, the share queries requesting the remote devices to identify available share folders or files located on the remote devices;
means for assembling a list of the remote devices and available share folders or files located on the remote devices, the list assembled using information obtained using the share query; and
means for mounting one or more of the listed share folders or files according to user selections such that the mounted share folders or files are not downloaded during the mounting but are made utilizable as if stored locally;
wherein the device name query and the share query are sent and the responses received, without going through an intermediary master browsers;
wherein the device name query is conducted using a NetBIOS name Query and the share query is conducted using a NETrShareEnum query.

10. The apparatus according to claim 9 wherein the device name query identifies Server Message Blocks (SMBs) and Common Internet File System (CIES) servers on the LAN.

11. The apparatus according to claim 9 wherein the device name query is generated without preknowledge of the IP address of the remote devices.

12. The apparatus according to claim 9 wherein the packets originate from is a Television device configured to play out remotely located media files.

13. A computer-implemented method, comprising:
conducting a device name query by addressing and sending one or more packets using a predetermined broadcast Internet Protocol (IP) address, the presence of the predetermined broadcast IP address in the packets causing remote devices located on a Local Area Network (LAN) to provide their IP address responsive to observing the predetermined broadcast IP address contained in the packets:
correlating received responses to the sent packets to discover the IP addresses of the remote devices;
addressing and sending share queries to the remote devices using the discovered IP addresses the share queries requesting the remote devices to identify available share folders or files located on the remote devices;
assembling a list of the remote devices and available share folders or files located on the remote devices, the list assembled using information obtained using the share query; and
mounting one or more of the listed share folders or files according to user selections such that the mounted share folders or files are not downloaded during the mounting but are made utilizable as if stored locally;
wherein the device name query and the share query are sent, and the response received without going through an intermediary master browser;
wherein the device name query is conducted using a NetBIOS name query and the share query is conducted using a NETrShareEnum query.

14. The computer-implemented method according to claim 13 including using a broadcast address to send the device name query.

15. The computer-implemented method according to claim 13 including using a multicast address to send the device name query.

16. The computer-implemented method according to claim 13 including using the device name query to identify Server Message Blocks (SMBs) and Common Internet File System (CIFS) servers on the LAN.

17. The computer-implemented method according to claim 13 including:
preconfiguring a username and password to one or more of the share files or folders; and
mounting the share files or folders when a received username and password correspond to the preconfigured username and password.

18. The computer-implemented method according to claim 13 including:
associating a username or password with one or more of the share files or folders;
prompting a user to enter the associated username or password when the share files or folders are selected for mounting; and
mounting the selected share files or folders shares only when the correct username or password is entered.

19. A computer comprising one or more processors operable to:
conduct a device name query by addressing and sending one or more packets using a predetermined broadcast Internet Protocol (IP) address, the presence of the predetermined broadcast IP address in the packets causing remote devices located on a Local Area Network (LAN) to provide their IP address responsive to observing the predetermined broadcast IP address contained in the packets:
correlate received responses to the sent packets to discover the IP addresses of the remote devices:
address and send share queries to the remote devices using the discovered IP addresses, the share queries requesting the remote devices to identify available share folders or files located on the remote devices;
assemble a list of the remote devices and available share folders or files located on the remote devices, the list assembled using information obtained using the share query; and
mount one or more of the listed share folders or files according to user selections such that the mounted share folders or files are not downloaded during the mounting but are made utilizable as if stored locally;
wherein the device name query and the share query are sent, and the responses received, without going through an intermediately master browser;
wherein the device name query is conducted using a NetBIOS name query and the share query is conducted using a NETrShareEnum query.

20. The computer of claim 19 wherein the device name query is transferred proactively without waiting for any relayed host discovery information and without preknowledge of any of the provided IP addresses.

21. The computer of claim 19 wherein the device name query is transferred proactively and independently of whether the computer has discovered any remote network devices on the LAN or any other network.

22. The share discovery system of claim 1 wherein the device name query is broadcast from the computer independently of whether the computer has discovered any device IP addresses other than an IP address for the computer.

23. The apparatus of claim 9 wherein:
the device discovery query is sent independently of whether the apparatus has discovered any device IP addresses other than an IP address for the apparatus.

24. The computer-implemented method of claim 13 wherein the packets are sent independently of whether a computer originating the packets has discovered any IP addresses of any remote devices.

* * * * *

UNITED STATES PATENT AND TRADEMARK OFFICE
CERTIFICATE OF CORRECTION

PATENT NO. : 7,366,720 B2  Page 1 of 1
APPLICATION NO. : 10/961285
DATED : April 29, 2008
INVENTOR(S) : Deshpande It is certified that error appears in the above-identified patent and that said Letters Patent is hereby corrected as shown below:

On the title page, item [60] under "Related U.S. Application Data", please remove "provisional application No. 60/535,119 filed on Jan. 6, 2004.".
At column 11, line 33, please replace "master browsers;" with --master browser;--.
At column 11, line 39, please replace "(CIES)" with --(CIFS)--.

Signed and Sealed this

Thirtieth Day of March, 2010

David J. Kappos
*Director of the United States Patent and Trademark Office*